US008095280B2

(12) United States Patent
Price

(10) Patent No.: US 8,095,280 B2
(45) Date of Patent: Jan. 10, 2012

(54) METHOD FOR ADJUSTING ENGINE SPEED BASED ON POWER USAGE OF MACHINE

(75) Inventor: Robert J. Price, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 818 days.

(21) Appl. No.: 12/156,482

(22) Filed: Jun. 2, 2008

(65) Prior Publication Data

US 2009/0299581 A1 Dec. 3, 2009

(51) Int. Cl.
*G06F 7/70* (2006.01)
*G06F 19/00* (2011.01)

(52) U.S. Cl. ........................................................ 701/50

(58) Field of Classification Search .................... 701/50, 701/99, 101, 110; 172/2, 3
See application file for complete search history.

(56) References Cited

U.S. PATENT DOCUMENTS 4,580,465 A * 4/1986 Omitsu ........................... 701/54
4,720,793 A * 1/1988 Watanabe et al. ............... 701/54
5,018,595 A * 5/1991 Hara et al. .................... 180/197
5,257,193 A * 10/1993 Kusaka et al. ................ 701/110
5,469,646 A 11/1995 Takamura
6,135,918 A * 10/2000 Bellinger et al. ............. 477/111
6,144,910 A 11/2000 Scarlett et al.
6,226,582 B1 5/2001 Adsett et al.
6,249,727 B1 6/2001 Muller
6,553,302 B2 4/2003 Goodnight et al.
6,665,605 B2 * 12/2003 Boyer et al. .................. 701/103
6,694,240 B1 2/2004 Swick et al.
6,756,912 B2 6/2004 Skiver et al.
6,957,139 B2 * 10/2005 Bellinger ...................... 701/104
7,020,553 B2 3/2006 Nakamura et al.
7,141,001 B1 11/2006 Albanesi
7,273,125 B2 9/2007 Schuh
7,308,352 B2 * 12/2007 Wang et al. ..................... 701/70
2005/0283295 A1 12/2005 Normann
2006/0047377 A1 3/2006 Ferguson et al.
2006/0276948 A1 12/2006 Toda
2007/0038355 A1 2/2007 Brandt et al.
2007/0050115 A1 3/2007 Discenzo et al.
2009/0143934 A1 * 6/2009 Motonaga et al. .............. 701/29
2010/0174456 A1 * 7/2010 Beaudoin et al. ............... 701/51

FOREIGN PATENT DOCUMENTS

WO WO 2008022455 A1 * 2/2008

* cited by examiner

*Primary Examiner* — Bret Hayes
(74) *Attorney, Agent, or Firm* — Liell & McNeil

(57) ABSTRACT

A method for controlling an engine of a machine includes a step of setting an initial engine speed of the engine based on a position of an operator engine speed selection device. The machine is operated for a period of time at the initial engine speed, and a power usage value for the machine during that period of time is identified. The initial engine speed of the engine is then lowered to a reduced engine speed corresponding to the power usage value.

16 Claims, 5 Drawing Sheets

METHOD FOR ADJUSTING ENGINE SPEED BASED ON POWER USAGE OF MACHINE

TECHNICAL FIELD

The present disclosure relates generally to a method for adjusting engine speed, and more particularly to reducing engine speed based on power usage of the machine during an operation period.

BACKGROUND

Machines are typically designed to perform a variety of different operations, such as, for example, work cycles that may be performed repetitively. According to one example, a work cycle for a wheel loader may include a plurality of work cycle segments, i.e., a dig segment, a reverse lift segment, a forward lift segment, a dump segment, a reverse lower segment, and a forward lower segment, performed sequentially. It should be appreciated that performance of each work cycle segment may require a different amount of power from a power source, such as an internal combustion engine, of the machine. For example, the dig segment or reverse lift segment, performed while the machine is loading and/or carrying a payload, may require more power than the reverse lower segment, performed while the bucket is empty. Oftentimes, however, an operator of the machine may select a constant engine speed, such as a high engine speed corresponding to a high power output, to perform all of the work cycle segments, or operations, of the machine.

Operating the machine at a high engine speed or, rather, a high number of revolutions per minute normally leads to high fuel consumption. Although there has been a desire to increase the productivity of work operations of the machine, it should be appreciated that there may be times when the high engine speed and, thus, high fuel consumption of the machine are not contributing to the productivity of the machine. For example, a high power output and, as a result, high fuel consumption may be required to achieve a high productivity level for some machine operations, but not all. Therefore, it may be desirable to reduce engine speed and, as a result, fuel consumption when it is not significantly contributing to a desired productivity level.

U.S. Patent Application Publication No. 2006/0276948 teaches a control method and device for automatically changing a power output capacity of an engine of a machine between a high output mode and a low output mode. Specifically, a determination is made as to whether excavation or uphill travel is being performed and, if so, the engine is controlled to operate at a high output capacity. While performing any other operation, the engine is controlled to operate at a low output capacity. Although this control method may serve to reduce fuel consumption when operating at a low output capacity, it does not provide flexibility based on current power demands of the machine, regardless of the operation being performed. As should be appreciated, there is a continuing need for control schemes that reduce fuel consumption without adversely affecting productivity.

The present disclosure is directed to one or more of the problems set forth above.

SUMMARY OF THE DISCLOSURE

In one aspect, a method for controlling an engine of a machine includes a step of setting an initial engine speed of the engine based on a position of an operator engine speed selection device. The machine is operated for a period of time at the initial engine speed, and a power usage value for the machine during that period of time is identified. The initial engine speed of the engine is then lowered to a reduced engine speed corresponding to the power usage value.

In another aspect, a machine having a control system for controlling an engine includes an operator engine speed selection device configured to receive an operator input of a desired engine speed setting. An electronic controller is configured to set an initial engine speed of the engine to correspond to the desired engine speed setting. The electronic controller is also configured to identify a power usage value for the machine during an operation period, and lower the initial engine speed of the engine to a reduced engine speed corresponding to the power usage value.

DETAILED DESCRIPTION

Figure 1:
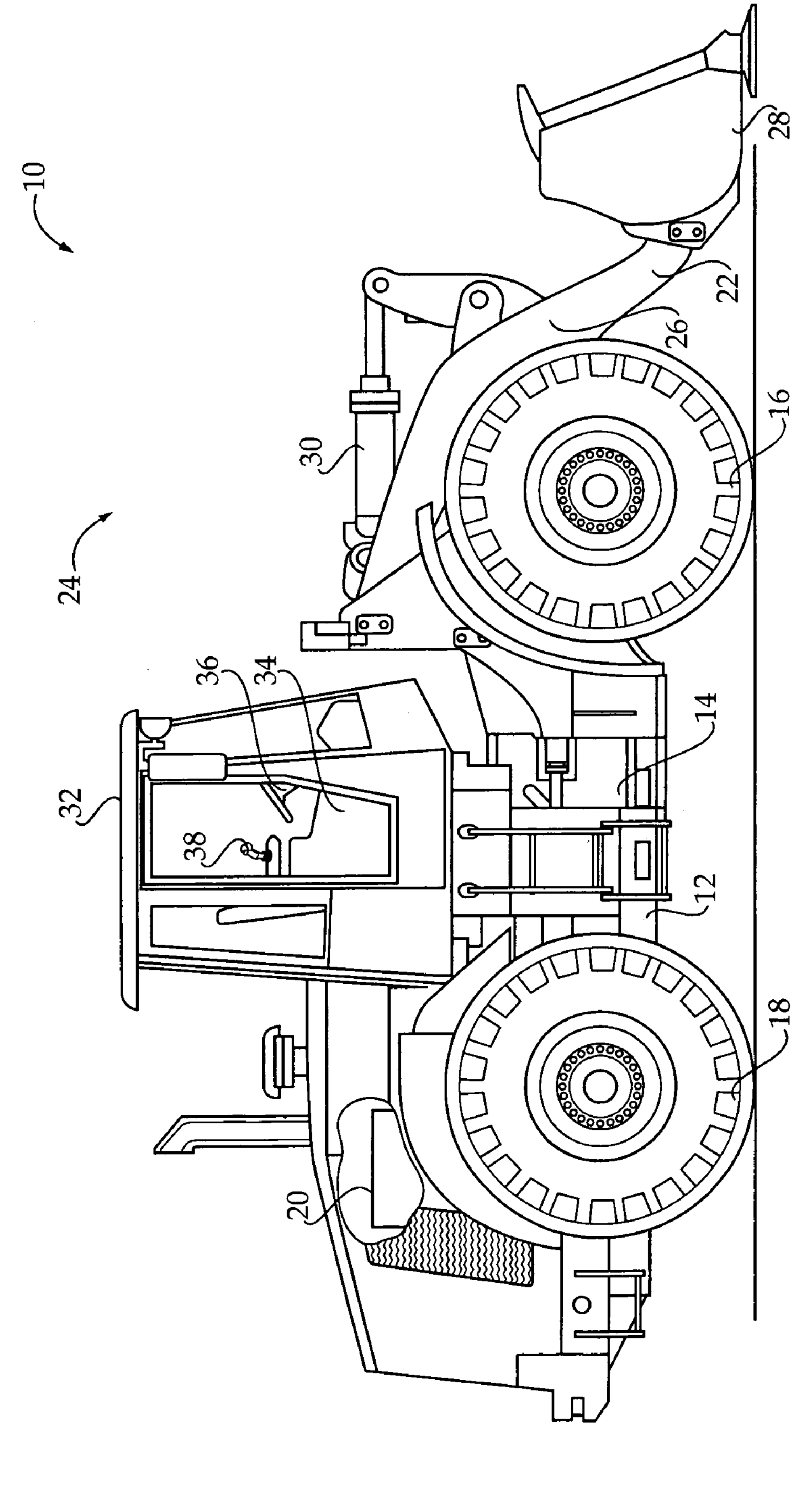
FIG. 1 is a side diagrammatic view of a machine, according to the present disclosure.

An exemplary embodiment of a machine 10 is shown generally in FIG. 1. The machine 10 may be a wheel loader, as shown, or any other on-highway or off-highway vehicle used to perform work operations. In the illustrated embodiment, machine 10 includes a machine body 12 having a drive system 14 supported thereon for driving wheels of the machine 10, such as, for example, front wheels 16 or rear wheels 18. Drive systems, also known as drivetrains or powertrains, typically receive power from an internal combustion engine 20, or other power source, and transmit that power to one or more ground engaging elements, such as the front wheels 16 or rear wheels 18, using any known means. According to a specific example, the drive system 14 may include a transmission, torque converter, final drive assembly, and/or any other known components. It should be appreciated, however, that a variety of drive systems are contemplated for propelling the machine 10.

The internal combustion engine 20 may also provide power for one or more implements, such as a loader 22, attached to the machine body 12 at a front end 24 of the machine 10. The loader 22 may include a pair of arms 26 movably attached to the front end 24 of the machine body 12. The pair of arms 26 may be moved upward and downward in order to lift and lower a bucket 28. The bucket 28, useful in supporting a payload material, may be movably attached to the pair of arms 26, and may be tilted about a horizontal axis. As is known in the art, one or more hydraulic cylinders 30 may be positioned to control movement of each aspect of the loader 22, such as, for example, moving the pair of arms 26 and tilting the bucket 28. As such, the internal combustion engine 20 may provide power to a hydraulic system (described below in greater detail) that supplies pressurized hydraulic fluid to the one or more hydraulic cylinders 30.

An operator control station 32 may be mounted to the machine body 12 and may include common devices, such as, for example, a seat assembly 34 and a steering device 36 that facilitate operator control. The operator control station 32 may include various other devices, including, but not limited to, one or more machine operation controllers. For example, a machine operation controller may be provided for controlling movement of an implement, such as the loader 22, of the machine 10. In addition, a machine operation controller may be provided for controlling a direction of movement of the machine 10, such as a forward, neutral, or reverse direction. The operator control station 32 may also include an operator engine speed selection device 38, such as, for example, a throttle, for selecting an engine speed of the internal combustion engine 20.

Figure 2:
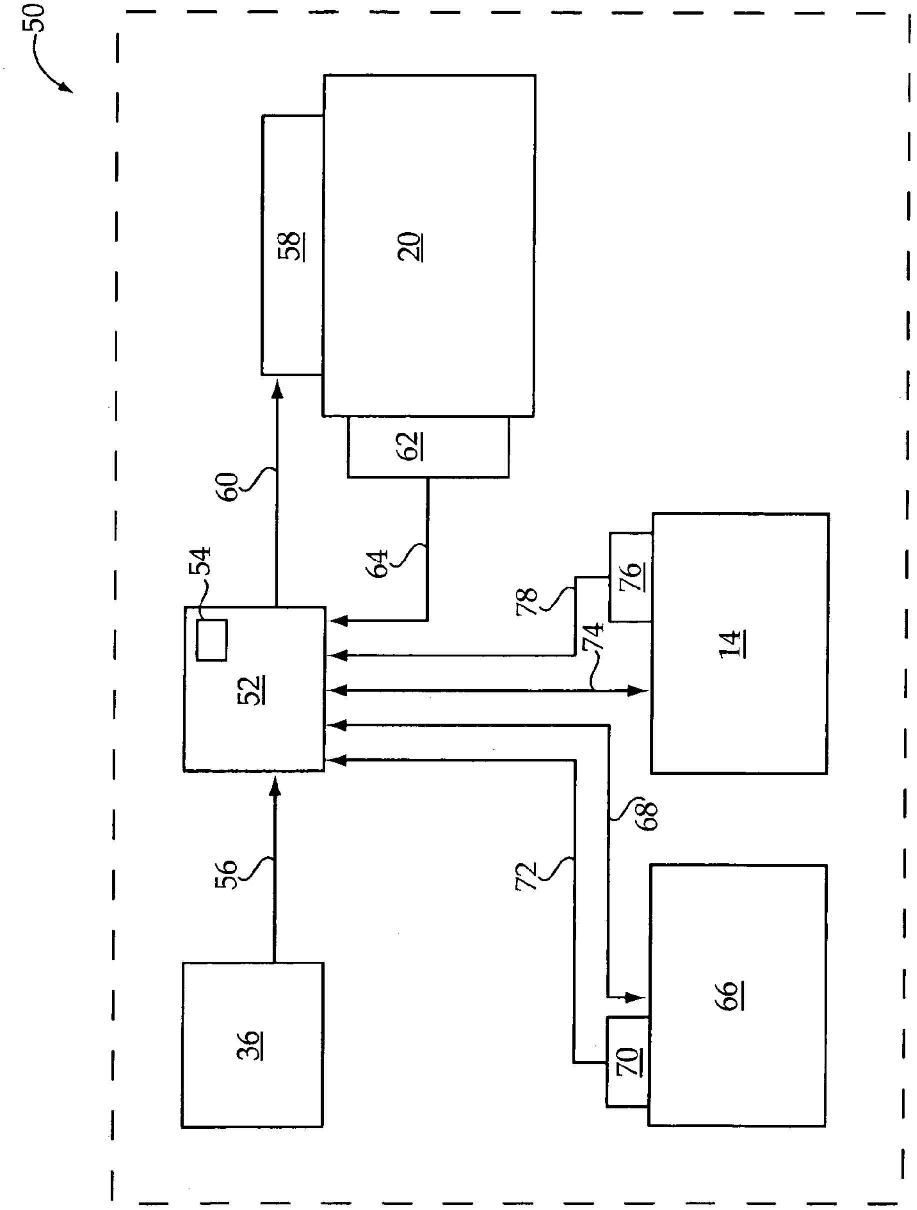
FIG. 2 is a block diagram of an exemplary control system for a machine, such as the machine of FIG. 1, according to the present disclosure.

Turning now to FIG. 2, an exemplary control system for controlling the internal combustion engine 20, and other components, of machine 10 is shown generally at 50. Specifically, the control system 50 may include one or more electronic controllers, such as electronic controller 52. The electronic controller 52 may be of standard design and may include a processor, such as, for example, a central processing unit, a memory 54, and an input/output circuit that facilitates communication internal and external to the electronic controller 52. The processor may control operation of the electronic controller 52 by executing operating instructions, such as, for example, computer readable program code stored in memory 54, wherein operations may be initiated internally or externally to the electronic controller 52. A control scheme may be utilized that monitors outputs of systems or devices, such as, for example, sensors, actuators, or control units, via the input/output circuit to control inputs to various other systems or devices.

The memory 54 may comprise temporary storage areas, such as, for example, cache, virtual memory, or random access memory, or permanent storage areas, such as, for example, read-only memory, removable drives, network/internet storage, hard drives, flash memory, memory sticks, or any other known volatile or non-volatile data storage devices. Such devices may be located internally or externally to the electronic controller 52. One skilled in the art will appreciate that any computer based system or device utilizing similar components for controlling the machine components or devices described herein, is suitable for use with the present disclosure.

The electronic controller 52 may be in communication with the operator engine speed selection device 38, shown in FIG. 1, via a communications line 56, which may include a wired and/or wireless connection. The operator engine speed selection device 38, as is well known in the art, may include a movable component, such as, for example, a lever, switch, or rotational device, that is movable between two or more positions. As such, the operator engine speed selection device 38 may be configured to receive an operator input of a desired engine speed setting. According to one embodiment, the operator engine speed selection device 38 may be movable between two or more settings of desired power output, such as, for example, a high engine speed corresponding to a high power output level and a low engine speed corresponding to a low power output level.

The electronic controller 52 may be configured to identify the desired engine speed, based on the position of the engine speed selection device 38, and, in response, set an initial engine speed of the internal combustion engine 20 to correspond to the desired engine speed setting. It should be appreciated that, according to one embodiment, the electronic controller 52 may be in communication with a fuel system 58, via a communications line 60, to control the engine speed of the internal combustion engine 20. Specifically, the electronic controller 52 may communicate with one or more electronically controlled fuel injectors of fuel system 58 to control the flow of fuel to the internal combustion engine 20, thereby controlling the engine speed. Further, an engine speed sensor 62 may be configured to communicate with the electronic controller 52, via a wired or wireless communications line 64, to provide an indication to the electronic controller 52 of the current speed of the internal combustion engine 20.

The electronic controller 52 may also communicate with a hydraulic system 66. As referenced above, the hydraulic system 66 may provide pressurized hydraulic fluid to one or more implements, such as the loader 22. According to one embodiment, the hydraulic system 66 may include a pump, such as a variable displacement pump, connected to a hydraulic fluid source. The electronic controller 52 may communicate with the hydraulic pump of hydraulic system 66, via communications line 68, to vary the angle of a swash plate, thereby controlling the output pressure of the hydraulic pump. Specifically, the electronic controller 52 may produce control signals, such as control signals produced in response to signals received from a machine operation controller, which may generate movement of the loader 22.

Although a variable displacement pump is described, it should be appreciated that a fixed displacement pump and associated valves, such as electronically controlled valves, may alternatively be used to control the flow of fluid to one or more implements, such as loader 22. The hydraulic system 66 may also include one or more sensors, such as pressure sensors 70, configured to produce signals over one or more communications lines 72 that are indicative of the pressure and/or flow of hydraulic fluid that is provided to the loader 22. Specifically, the one or more sensors 70 may monitor the pressure and/or flow of hydraulic fluid that is provided to hydraulic cylinders 30. As such, the electronic controller 52 may be configured to identify various operational aspects of the loader 22 by monitoring the one or more sensors 70.

In addition, the electronic controller 52 may communicate with one or more components of the drive system 14, via communications line 74. As referenced above, the drive system 14 may include any known components for propelling the machine 10. According to one embodiment, the drive system 14 may include the internal combustion engine 20 connected, through an output shaft, to a torque converter. Torque converters are also known and may provide a variable output speed and torque to a transmission, which, in turn, may drive one or more ground engaging elements, such as the front wheels 16 or rear wheels 18, of the machine 10.

One or more sensors, such as, for example, a drive system torque sensor 76, may produce a signal over a communications line 78 indicative of the rotational speed of the torque converter. According to one embodiment, this rotational speed may be used to determine the ground speed of the machine 10. Alternatively, however, it should be appreciated that various other sensors, such as, for example, a transmission output sensor or ground speed sensor, may be used for measuring the ground speed of the machine 10. The electronic controller 52 may monitor the drive system torque sensor 76, or other sensors, to identify various operational aspects of the drive system 14. According to one embodiment, the measured ground speed of the machine 10 may be used to determine a power requirement from the internal combustion engine 20 for providing the measured speed.

Although a single electronic controller 52 is described, it should be appreciated that a plurality of electronic controllers may be used by the machine 10 and, further, may be configured to operate in a hierarchical manner. For example, a drive system electronic controller may be provided for controlling operation of the drive system 14, while a hydraulic system electronic controller may be provided for controlling operation of the hydraulic system 66. Further, an engine electronic controller may be configured for controlling operation of the internal combustion engine 20. Electronic controller 52, according to the described configuration, may be designated a master electronic controller that includes one or more algorithms executed thereon for controlling and/or coordinating operation of all of the electronic controllers utilized by machine 10.

The electronic controller 52 may also be configured to evaluate the amount of power that is utilized, or demanded, from the internal combustion engine 20 by one or more components of the machine 10. Such components, systems, or devices may be referenced herein as power utilizing components. According to a specific embodiment, the electronic controller 52 may evaluate the power, or horsepower, used by the drive system 14, the hydraulic system 66, and other power utilizing components. For example, the electronic controller 52 may monitor a plurality of sensors, such as sensors 70 and 76, to determine the power used, or required, by the hydraulic system 66 and drive system 14, respectively, during an operation period of the machine 10. More specifically, the electronic controller 52 may use values provided by the sensors, such as sensors 70 and 76, along with various reference maps, formulas, and/or algorithms stored in memory 54, to determine power usage values for each power utilizing component that is monitored.

Figure 3:
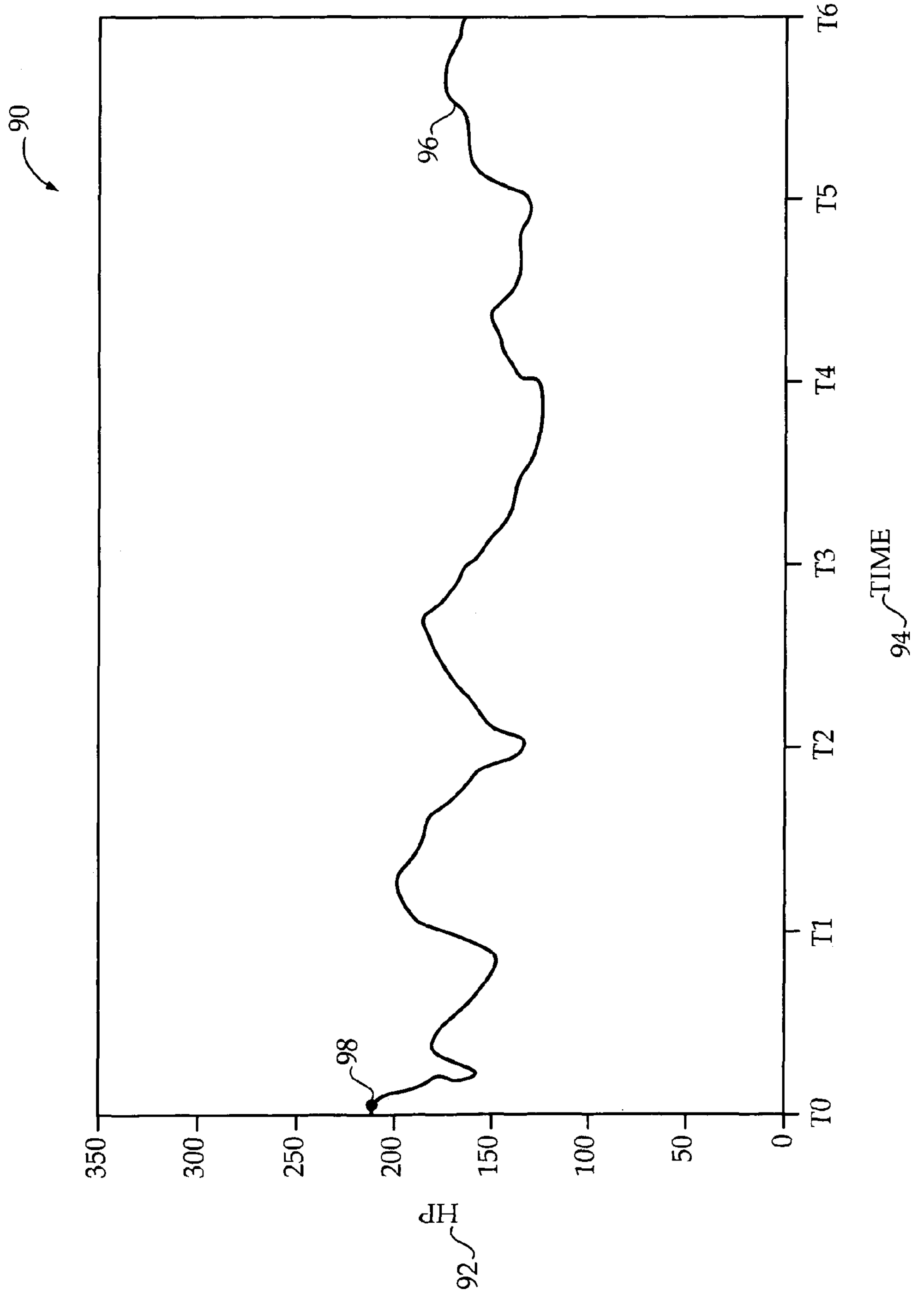
FIG. 3 is an exemplary graph of horsepower versus time illustrating a power usage line for an operation period of the machine of FIG. 1, determined according to the present disclosure.

Turning to FIG. 3, an exemplary graph 90 of horsepower 92, shown on the vertical axis, versus time 94, shown on the horizontal axis, for an operation period, or time period, of the machine 10 is shown. A power usage line 96, shown on graph 90, may represent horsepower 92 utilized by the machine 10 during a time period between T0 and T6, as determined by the electronic controller 52. Specifically, the power usage line 96 may be representative of the combined horsepower used by all of the power utilizing components of the machine 10, such as, for example, the drive system 14 and the hydraulic system 66. It should be appreciated that the operation period, such as the time period between T0 and T6 depicted on graph 90, may represent a predetermined amount of time during which the machine 10 is operated. It should be appreciated that the operation period may be selected to ensure a fair measurement of the combined power usage of machine 10.

After the machine 10 is operated for the predetermined period of time, the electronic controller 52 may be configured to identify a power usage value, such as a power usage value 98 along the power usage line 96. It should be appreciated that the power usage value 98, according to one embodiment, may represent the maximum amount of horsepower demanded from the internal combustion engine 20 by all of the power utilizing components of the machine 10 during the predetermined period of time. Alternatively, however, the power usage value 98 may represent a deviation from the maximum amount of power usage, or any other desired measurement or calculation of power usage. According to another embodiment, the power usage value 98 may represent the power demand required to operate the machine 10 at a desired productivity level, such as determined by an owner or operator of the machine 10.

The electronic controller 52 may be configured to then lower the initial engine speed of the internal combustion engine 20, as set according to the operator engine speed selection device 38, to a reduced engine speed corresponding to the power usage value 98. According to a specific embodiment, the electronic controller 52 may be configured to lower the initial engine speed of the internal combustion engine 20 to a speed sufficient to provide the horsepower required by the power utilizing components of the machine 10 during the operation period.

Further, the electronic controller 52 may be configured to identify a repeated pattern of power usage of the machine 10. Specifically, the electronic controller 52 may be configured to recognize that the combined power usage, such as the power usage represented by power usage line 96, may repeat, within a predetermined amount of variance, during operation of the machine 10. According to a specific example, the electronic controller 52 may determine that the power usage line 96 shown between times T0 and T6 may repeat during an extended operation of the machine 10. Further, the electronic controller 52 may be configured to identify a plurality of segments within the repeated pattern of power usage.

Figure 4:
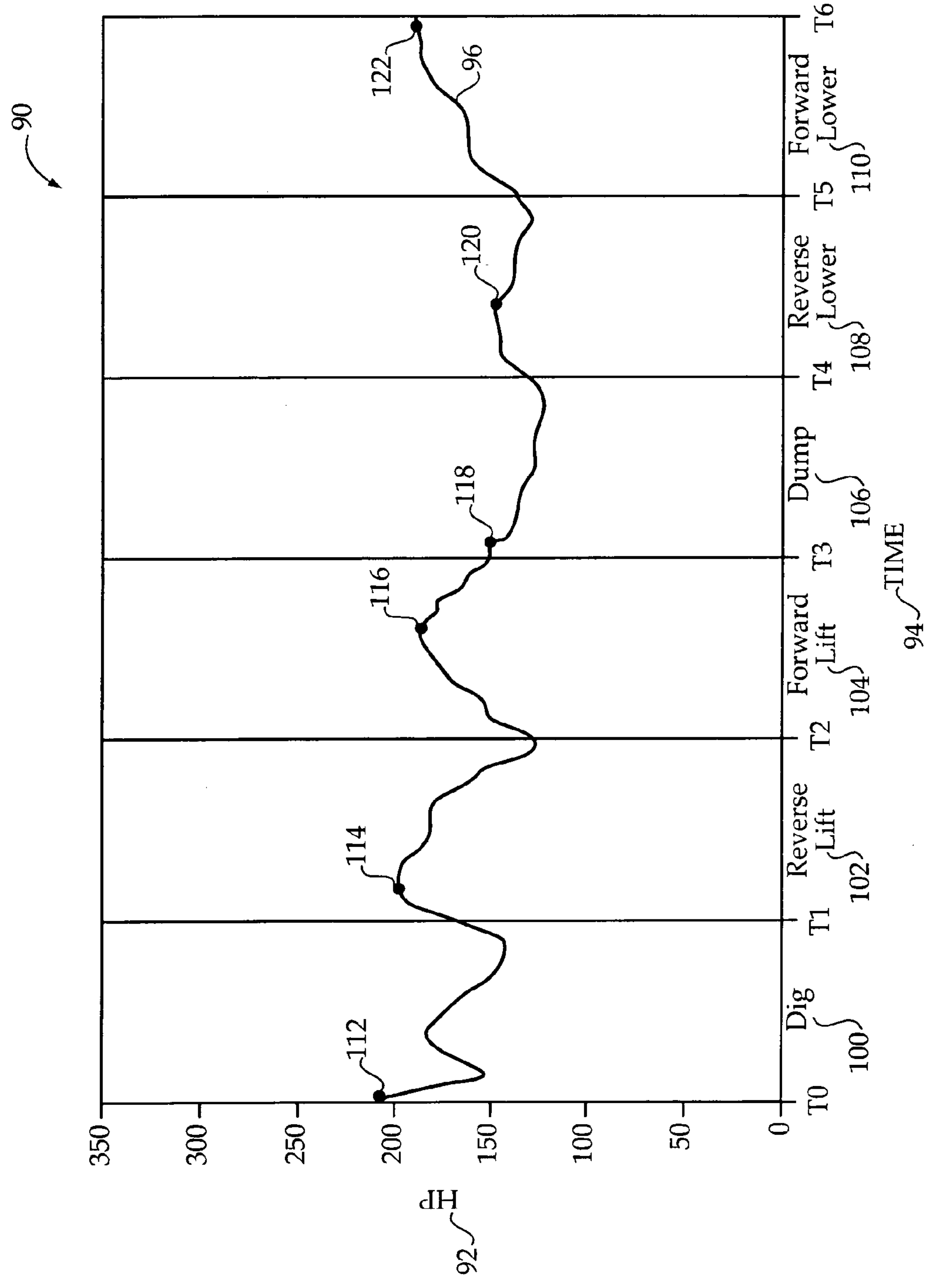
FIG. 4 is an exemplary graph illustrating the power usage line of FIG. 3 for an operation period including a plurality of segments, determined according to the present disclosure.

For exemplary purposes, it should be appreciated that the power usage line 96, between times T0 and T6 of graph 90, may represent a cycle, such as a work cycle, of the machine 10. The work cycle may be repeated during operation of the machine 10, and may further be parsed into a plurality of segments 100-110, as shown in FIG. 4. According to one example, the machine 10 may be a wheel loader, as shown in FIG. 1, designed to perform a work cycle that includes a plurality of work cycle segments, such as segments 100-110. Specifically, the work cycle may include a dig segment 100, a reverse lift segment 102, a forward lift segment 104, a dump segment 106, a reverse lower segment 108, and a forward lower segment 110. It should be appreciated that performance of each work cycle segment 100-110 may require a different, but relatively consistent, amount of power from the internal combustion engine 20.

As such, it may be desirable to identify a power usage value, shown at points 112-122, for each of the respective segments, or work cycle segments, 100-110. The power usage values 112-122 may also represent maximum power usage of the machine 10 during an operation or period of time, or may represent another useful measurement or calculation of power usage. According to one embodiment, it may be desirable to identify the power usage values 112-122 after operating the machine 10 through the repeated pattern of power usage a predetermined number of times. The electronic controller 52 may be configured to adjust the reduced engine speed, calculated above, to an adjusted engine speed corresponding to the power usage value 112-122 for each of the plurality of work cycle segments 100-110. Specifically, the electronic controller 52 may be configured to detect which of the work cycle segments 100-110 is being performed and, in response, adjust the reduced engine speed of the internal combustion engine 20 to a speed sufficient to provide the horsepower necessary for the detected work cycle segment.

According to one embodiment, the electronic controller 52 may be configured to detect a transition to each of the plurality of work cycle segments 100-110, such as by monitoring operational aspects of the hydraulic system 66 and/or the drive system 14 using sensors 70 and 76, respectively. Upon detecting a transition to one of the work cycle segments 100-110, the electronic controller 52 may automatically adjust the reduced engine speed to an adjusted engine speed corresponding to the power usage value 112-122 for the respective work cycle segment 100-110. For example, the electronic controller 52 may detect a transition from the dig segment 100 to the reverse lift segment 102 by determining that the bucket 28 has recently engaged a pile of material and/or the bucket 28 is being tilted, such as, for example, by monitoring sensors 70. Upon detecting the transition, the electronic controller 52 may adjust the reduced engine speed to an adjusted engine speed corresponding to the power usage value 114 for the reverse lift segment 102.

According to yet another embodiment, the electronic controller 52 may be configured to detect an anticipated transition to each of the plurality of work cycle segments 100-110. It should be appreciated that the anticipated transition may occur at any time period prior to the transition described above, and may be selected based on the type of machine 10 being used, the work cycle being performed, the responsiveness desired, and/or any number of factors. The anticipated transition may be detected in a similar manner as described above, such as by monitoring operational aspects of the hydraulic system 66 and/or the drive system 14. Upon detecting the anticipated transition, the electronic controller 52 may automatically adjust the reduced engine speed to an adjusted engine speed corresponding to the power usage value for the work cycle segment about to be performed.

If desired, the plurality of work cycle segments 100-110 may each be divided into segments. For example, the reverse lift segment 102 may be divided into a beginning segment, a middle segment, and an end segment, representing time periods within the reverse lift segment 102. The electronic controller 52 may be configured to identify a power usage value, such as power usage value 114, during only a portion, such as, for example, the middle segment, of the reverse lift segment 102, rather than the entire segment 102. In addition, the electronic controller 52 may be configured to adjust the reduced engine speed to an adjusted engine speed, as described above, in response to a transition, or anticipated transition, to a portion, such as the middle segment, of the reverse lift segment 102. Alternatively, however, the electronic controller 52 may be configured to identify a power usage value for each of the beginning, middle, and end segments, and, further, to adjust the reduced engine speed for each portion of the segment.

One skilled in the art should appreciated that the power usage values, such as the power usage value 98 of FIG. 3 and the power usage values 112-122 of FIG. 4, may be determined in any of a number of ways. For example, as referenced above, the electronic controller 52 may be configured to monitor various operational aspects of the hydraulic system 66 and/or the drive system 14 using sensors 70 and 76, respectively, to determine, or measure, the amount of power used during the monitored operations. Alternatively, the electronic controller 52 may be configured to detect the performance of a work cycle or, more specifically, a work cycle segment based on operational characteristics of the machine 10, and select a power usage value corresponding to the detected operation. For example, upon detecting the performance of the dump segment 106 of FIG. 4, the electronic controller 52 may be configured to select a power usage value from a table stored in memory 54.

According to yet another example, the power usage values, such as power usage values 98 and 112-122, may be determined based on a payload value for the machine 10. For example, a payload capacity for the machine 10 may be provided, along with a power usage value that corresponds to the payload capacity or that represents a maximum power capacity of the machine 10. Further, as is known in the art, the machine 10 may include capabilities, such as, for example, a payload monitor, for measuring and tracking the payload of the machine 10. Further, the electronic controller 52 may include means for identifying the maximum payload value, or payload weight, for the machine 10 during an operation or period of time. If the maximum payload value is less than the payload capacity, for example, it may be desirable to scale down the current power usage of the machine 10 a predetermined amount, such as by using a scaling map stored in memory 54.

According to one embodiment, a power usage value for an operation period of the machine 10 may be set based on the maximum payload value, as determined by any known payload monitor. Thus, the present disclosure recognizes that if the operator is operating the machine 10 at less than the payload capacity, then the internal combustion engine 20 may be operated at less than full speed. In fact, the power usage value, such as power usage values 98 and 112-122, may be correlated to a percent payload in order to yield an estimated power demand based solely on the measured payload. Therefore, the power usage values 98 and 112-122 may be determined without employing the more intensive calculations described above that estimate power usage based on other operational aspects of the machine 10. It should be appreciated that the present disclosure contemplates any level of sophistication in arriving at a power usage estimate.

Figure 5:
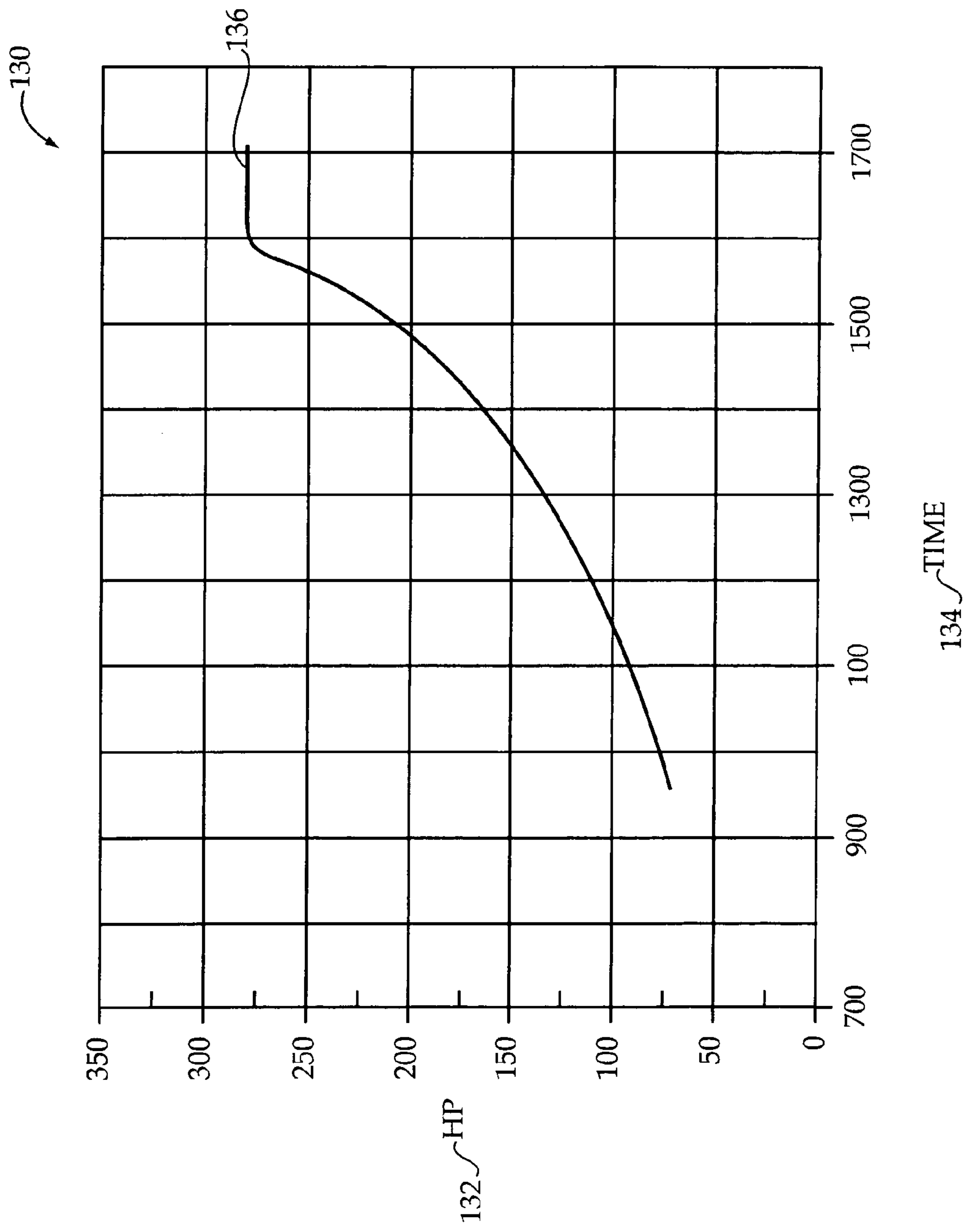
FIG. 5 is an exemplary engine speed map that may be referenced by the exemplary control system of FIG. 2.

Turning now to FIG. 5, it should be appreciated that the reduced and/or adjusted engine speeds may be selected from an engine speed map, or graph, 130 stored in memory 54. Specifically, FIG. 5 illustrates a graph of horsepower 132, shown on the vertical axis, versus engine speed 134, shown on the horizontal axis. Depicted on the graph is a lug curve 136 that may be provided by a manufacturer of the machine 10. The electronic controller 52, according to one example, may be configured to select a reduced or adjusted engine speed from the engine speed map 130 that corresponds to the power usage or, rather, the horsepower required by the power utilizing components during an operation period.

It should be appreciated that enhancements to the described control system 50 and method may be provided without deviating from the scope of the present disclosure. For example, upon detecting a change in position of the operator engine speed selection device 38, the electronic controller 52 may be configured to adjust the reduced engine speed, or adjusted engine speed, to a value corresponding to the changed position of the operator engine speed selection device 38. Effectively, this may provide a means for overriding the reduced and/or adjusted engine speed of the internal combustion engine 20. Additionally, an operator interface may be provided in the operator control station 32 for enabling and/or disabling the automatic control feature described herein.

According to some embodiments, it may be desirable to determine and/or reference a skill level of the operator of the machine 10. The skill level may be programmed into the electronic controller 52, input into the electronic controller 52 by the operator using an operator interface, or determined by the electronic controller 52 based on evaluation of operational characteristics of the machine 10, as described above. It may be desirable, according to some embodiments, to also consider the operator skill level when selecting a reduced and/or adjusted engine speed. Specifically, for example, the electronic controller 52 may be configured to override an automatic adjustment of engine speed if it is determined that a highly skilled operator is controlling the machine 10. Additional customizations and enhancements are also contemplated.

INDUSTRIAL APPLICABILITY

The present disclosure may find potential application in any on-highway or off-highway machine designed to perform a work operation. Further, the present disclosure may be applicable to machines required to operate at a desired productivity level. Yet further, the present disclosure may apply to work operations of a machine requiring reduced fuel consumption, particularly when the fuel consumption is not significantly contributing to the desired productivity level. Such machines may include, but are not limited to, off-highway machines, such as wheel loaders or excavators, on-highway machines, such as buses and trucks, and other machines known in the art.

Referring generally to FIGS. 1-5, a machine 10 may include a machine body 12 having a drive system 14 supported thereon for driving wheels of the machine 10, such as, for example, front wheels 16 or rear wheels 18. Drive system 14 may receive power from an internal combustion engine 20, and may transmit that power to one or more ground engaging elements, such as the front wheels 16 or rear wheels 18, using any known means. The internal combustion engine 20 may also provide power for an implement, such as a loader 22, attached to the machine body 12 at a front end 24 of the machine 10.

During a typical operation, an operator may sit in a seat assembly 34 of the machine 10 and select a desired engine speed for the internal combustion engine 20 using an operator engine speed selection device 38. Oftentimes, the operator may select a high engine speed corresponding to a high power output in order to sufficiently perform each machine operation without having to frequently readjust the operator engine speed selection device 38. Operating the machine 10 at a high engine speed or, rather, a high number of revolutions per minute, however, normally leads to high fuel consumption. It should be appreciated that there may be times, during the operation of the machine 10, that the high engine speed and, thus, high fuel consumption does not contribute to the productivity of the machine 10.

Utilizing the control system 50 and method of operation thereof, as described herein, may help reduce engine speed and, as a result, fuel consumption when it is not significantly contributing to a desired productivity level. Specifically, after the machine 10 is operated for a predetermined period of time or through performance of a predetermined operation, such as at least one payload lift cycle, the electronic controller 52 may be configured to identify a power usage value 98. According to one embodiment, in which a payload value is used to determine the power usage value 98, the electronic controller 52 may wait to reduce engine speed until after three or more payload lift cycles. Further, the electronic controller 52 may be configured to use an average payload weight or maximum payload weight to arrive at a reduced engine speed. The electronic controller 52 may be configured to then lower the initial engine speed of the internal combustion engine 20, as selected according to the operator engine speed selection device 38, to a reduced engine speed corresponding to the power usage value 98.

Further, the electronic controller 52 may be configured to identify a repeated pattern of power usage, such as corresponding to a work cycle, of the machine 10. The work cycle may be repeated during operation of the machine 10, and may further be parsed into a plurality of segments, such as work cycle segments 100-110 shown in FIG. 4. The electronic controller 52 may be configured to identify a power usage value 112-122 for each of the respective work cycle segments 100-110, and adjust the reduced engine speed to an adjusted engine speed corresponding to the power usage value 112-122 for each of the plurality of work cycle segments 100-110. Specifically, the electronic controller 52 may be configured to detect which of the work cycle segments 100-110 is being performed and, in response, adjust the reduced engine speed of the internal combustion engine 20 to a speed sufficient to provide the horsepower required for the detected work cycle segment.

It should be appreciated that the control system 50 and method of the present disclosure, at a first level of sophistication, may provide a means for reducing the selected engine speed of the internal combustion engine 20 based on an evaluation of a power usage of the machine 10. Specifically, the engine speed may be reduced to provide only the power necessary to perform the current operations or to achieve a desired level of productivity. At a second level of sophistication, the control system 50 and method described herein may provide a means for adjusting the engine speed during distinct segments of an operation to, again, provide only the power that is required or deemed necessary. It should be appreciated that reducing the engine speed during times when it is unnecessarily high may significantly reduce the amount of fuel that is used during operation of the machine 10.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A method for controlling an engine of a machine, comprising:

setting an initial engine speed of the engine based on a position of an operator engine speed selection device;

operating the machine for a period of time;

identifying a power usage value for the machine corresponding to the period of time, wherein the power usage value comprises power used by at least a drive system and a hydraulic system during the period of time, or a payload value corresponding to the period of time; and lowering the initial engine speed of the engine to a reduced engine speed corresponding to the power usage value.

2. The method of claim 1, further including identifying a repeated pattern of power usage, wherein the repeated pattern of power usage includes a plurality of segments.

3. The method of claim 2, further including identifying the power usage value for each of the plurality of segments.

4. The method of claim 3, wherein the step of identifying the power usage value for each of the plurality of segments includes operating the machine through the repeated pattern of power usage a predetermined number of times.

5. The method of claim 3, further including:

detecting a transition to each of the plurality of segments; and adjusting the reduced engine speed to an adjusted engine speed corresponding to the power usage value for each of the plurality of segments in response to detecting the transition.

6. The method of claim 3, further including:

detecting an anticipated transition to each of the plurality of segments; and adjusting the reduced engine speed to the adjusted engine speed corresponding to the power usage value for each of the plurality of segments in response to detecting the anticipated transition.

7. The method of claim 1, wherein the lowering step includes selecting the reduced engine speed from an engine speed map stored in a memory.

8. The method of claim 1, further including:

changing the position of the operator engine speed selection device; and adjusting the reduced engine speed to a value corresponding to the changed position of the operator engine speed selection device.

9. A machine having a control system for controlling an engine, comprising:

an operator engine speed selection device configured to receive an operator input of a desired engine speed setting;

an electronic controller setting an initial engine speed of the engine to correspond to the desired engine speed setting; and wherein the electronic controller also identifies a power usage value for the machine corresponding to an operation period, and lowers the initial engine speed of the engine to a reduced engine speed corresponding to the power usage value;

wherein the power usage value comprises power used by at least a drive system and a hydraulic system during the period of time, or a payload value corresponding to the period of time.

10. The machine of claim 9, wherein the electronic controller is further configured to identify a repeated pattern of power usage having a plurality of segments.

11. The machine of claim 10, wherein the electronic controller is further configured to identify the power usage value for each of the plurality of segments.

12. The machine of claim 11, wherein the operation period includes operation of the machine through the repeated pattern of power usage a predetermined number of times.

13. The machine of claim 11, wherein the electronic controller is further configured to detect a transition to each of the plurality of segments, and adjust the reduced engine speed to an adjusted engine speed corresponding to the power usage value for each of the plurality of segments in response to detecting the transition.

14. The machine of claim 11, wherein the electronic controller is further configured to detect an anticipated transition to each of the plurality of segments, and adjust the reduced engine speed to the adjusted engine speed corresponding to the power usage value for each of the plurality of segments in response to detecting the anticipated transition.

15. The machine of claim 9, wherein the electronic controller is further configured to select the reduced engine speed from an engine speed map stored in a memory.

16. The machine of claim 9, wherein the electronic controller is further configured to detect a change in position of the operator engine speed selection device, and adjust the reduced engine speed to a value corresponding to the changed position of the operator engine speed selection device.

* * * * *